(No Model.)
A. P. SIBLEY.
PULLEY.
No. 384,871. Patented June 19, 1888.
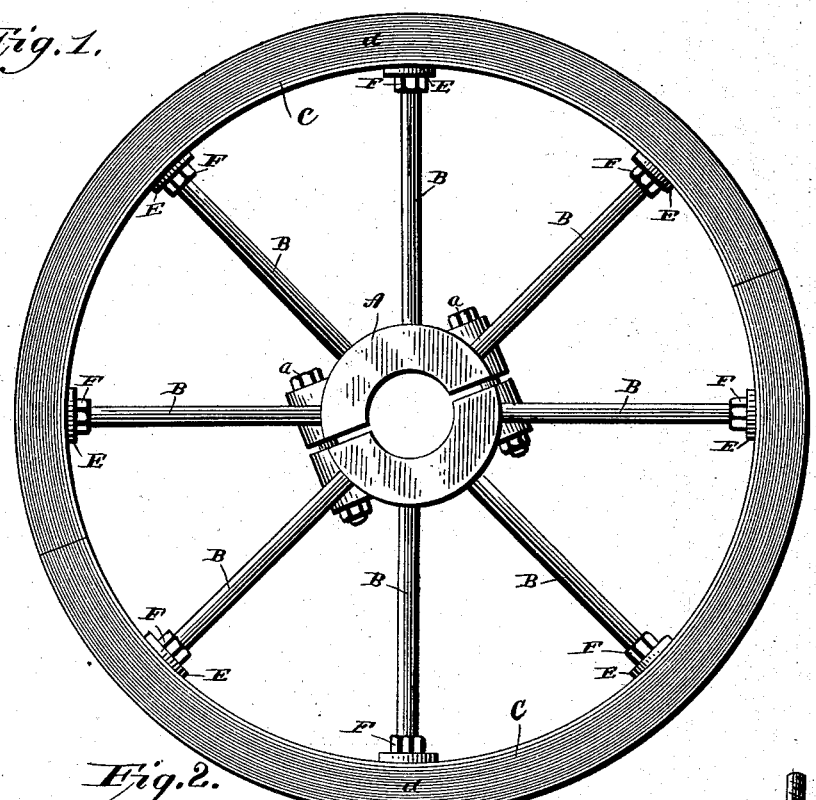
WITNESSES:
INVENTOR:
A. P. Sibley.
By C. M. Alexander,
Attorney.

UNITED STATES PATENT OFFICE.

ALBERT P. SIBLEY, OF SOUTH BEND, INDIANA, ASSIGNOR TO SIBLEY & WARE, OF SAME PLACE.

PULLEY.

SPECIFICATION forming part of Letters Patent No. 384,871, dated June 19, 1888.

Application filed January 16, 1888. Serial No. 260,912. (No model.)

*To all whom it may concern:*

Be it known that I, ALBERT P. SIBLEY, of the city of South Bend, county of St. Joseph, and State of Indiana, have invented certain new and useful Improvements in Pulleys, of which the following is a specification, reference being had to the accompanying drawings, in which—

Figure 1 represents a side view of the pulley complete; Fig. 2, a sectional view taken through a portion of the hub and rim; Fig. 3, a detail view of one of the arms or spokes, and Fig. 4 a detail view of one form of the metallic nut embedded or recessed in the rim of the pulley.

The object of this invention is essentially to provide an extremely light, strong, and inexpensive band-pulley that will offer but little resistance to the air while being rotated, whereby it may be run with less power than the ordinary pulley now in use, as will be more fully hereinafter set forth.

To this end the invention consists in certain novel features of construction and arrangement of parts, that will fully appear hereinafter, and be particularly pointed out in the claims appended.

Referring to the annexed drawings by letter, A designates the hub of the pulley, this hub being preferably made in two sections and bolted together by means of bolt $a$. This hub is provided with radial shouldered holes $b$, which receive the radial arms B, these arms being provided with heads $c$ on their inner ends, which rest in the said holes $b$ in the hub, as shown in Fig. 2, and prevent the arms from being withdrawn after the sections of the hub are once bolted together. In the drawings I have shown two rows of these radial arms; but it is evident that one or more rows may be employed, as the exigencies of the case may require. The outer ends of these arms are screw-threaded and inserted in similarly screw-threaded metallic nuts D, embedded in recesses in the rim C, said nuts being provided with heads or made angular in form, so as not to turn when the arms are screwed into them. By turning the arms B it will be observed the rim C may be tightened and trued whenever desired. The rim C of the pulley is preferably constructed of a suitable number of wooden segmental sections, $d$, which are secured together by glue, dowel-pins, screws, or other means. The nuts D are inserted in recesses in the sections $d$ before the same are secured together, by which means the said nuts are completely embedded in the rim and hid from view, the periphery of the pulley remaining continuous and smooth.

The letter F designates a jam-nut upon the outer screw-threaded portions of the arms B, adapted to bear, through the medium of an interposed washer, E, upon the inner face of the rim C, this jam-nut serving to more securely hold the arms B and prevent them working loose prematurely.

G designates another jam-nut, which may or may not be used upon the arms B, near their inner ends, adapted to bear upon the periphery of the hub and further secure the arms against turning, this nut G being shown on one of the arms in Fig. 2.

By constructing the rim C in the manner I have set forth, and embedding the nuts D in the same, the rim may be finished entirely before assembling the parts of the pulley, thus greatly facilitating its manufacture.

I wish it understood that I do not confine myself to the exact construction of parts shown and described, as it is evident that the same may be somewhat varied without departing from the spirit of this invention. For instance, the rim C may be made of a single piece of material or it may be made of metal. The hub may be cast integral and the arms screwed radially into it, and the shape of the arms B and the nuts D may be varied, as is evident.

Having thus fully described my invention, what I claim as new, and desire to secure by Letters Patent, is—

1. In a band-pulley, the combination, with a hub, of radial arms secured thereto and provided with screw-threads on their outer ends, a rim, and metallic nuts D, embedded in the rim, the outer screw-threaded ends of the said radial arms working in the said embedded nuts, substantially as described.

2. In a band-pulley, the combination of a hub, radial arms secured thereto and provided with screw-threads on their outer ends, a rim, metallic nuts D, embedded in this rim and adapted to receive the outer screw-threaded ends of the said radial arms, and washers and jam-nuts on the outer screw-threaded portions of the said radial arms, substantially as described.

3. In a pulley, the combination of the two-part hub provided with radial shouldered apertures, the arms B, inserted in these apertures, the said arms being provided with heads c on their inner ends and screw-threads on their outer ends, a rim, C, nuts embedded in this rim and adapted to secure the screw-threaded ends of the arms B, and jam-nuts F, substantially as herein described.

4. In a pulley, the combination of the hub provided with arms B, these arms being screw-threaded at their outer ends, a rim, C, constructed of segmental sections d, secured together, metallic nuts D, embedded in recesses in the sections of the rim and adapted to receive the outer screw-threaded ends of the arms B, and jam nuts and washers, as set forth.

ALBERT P. SIBLEY.

Witnesses:
MYRON CAMPBELL,
GEORGE O. WARE.